(12) United States Patent
Aumann et al.

(10) Patent No.: US 9,604,795 B2
(45) Date of Patent: Mar. 28, 2017

(54) TRANSPORT DEVICE FOR CONVEYING PRODUCTS

(71) Applicant: Uhlmann Pac-Systeme GmbH & Co. KG, Laupheim (DE)

(72) Inventors: Thomas Aumann, Mietingen (DE); Daniel Zieher, Ummendorf (DE); Fritz Fochler, Kammeltal-Behlingen (DE)

(73) Assignee: Uhlmann Pac-Systeme GmbH & Co. KG, Lapheim (DE)

( * ) Notice: Subject to any disclaimer, the term of this patent is extended or adjusted under 35 U.S.C. 154(b) by 0 days.

(21) Appl. No.: 14/970,012

(22) Filed: Dec. 15, 2015

(65) Prior Publication Data
US 2016/0176659 A1 Jun. 23, 2016

(30) Foreign Application Priority Data

Dec. 17, 2014 (EP) ..................................... 14198627

(51) Int. Cl.
*B65G 17/32* (2006.01)
*B65G 54/02* (2006.01)

(52) U.S. Cl.
CPC .......... *B65G 54/02* (2013.01); *B65G 2207/08* (2013.01)

(58) Field of Classification Search
CPC ....... B65G 17/32; B65G 17/002; B65G 54/02
USPC ..................... 198/805, 867.08; 104/290, 292
See application file for complete search history.

(56) References Cited

U.S. PATENT DOCUMENTS

| 4,817,533 A * | 4/1989 | Azukizawa ............ B65G 54/02 104/129 |
| 5,351,811 A | 10/1994 | Tisma |
| 5,461,851 A * | 10/1995 | Lehrieder ................ B41F 13/03 198/851 |
| 6,405,852 B1 * | 6/2002 | Christ ..................... B65B 43/52 198/474.1 |
| 6,722,836 B2 * | 4/2004 | Jager ........................ B23Q 7/14 198/358 |
| 7,928,613 B2 | 4/2011 | Jajtic et al. |

(Continued)

FOREIGN PATENT DOCUMENTS

| DE | 4137246 A1 | 7/1992 |
| DE | 102012210329 A1 | 12/2013 |

(Continued)

OTHER PUBLICATIONS

European Search Report for EP 1498627.3 dated May 27, 2015.

*Primary Examiner* — Douglas Hess
(74) *Attorney, Agent, or Firm* — Brinks Gilson & Lione

(57) ABSTRACT

The transport device for conveying products comprises at least one pair of movable slides and an endless guide rail for guiding the at least one pair of slides, one behind the other, in a variable conveying direction. A linear motor drive device serves to drive the at least one pair of slides. A retaining element is provided on each of the two slides, wherein the retaining elements of the first slide and of the second slide form a product receiving space between them. The retaining elements on the first and second slides are each rotatably supported around a rotational axis, which is substantially perpendicular to the variable conveying direction. At least one connecting element is provided to connect the retaining elements of the first and second slides together in such a way that the relative orientation of the retaining elements to each other is determined.

15 Claims, 4 Drawing Sheets

(56) References Cited

U.S. PATENT DOCUMENTS

| | | | |
|---|---|---|---|
| 8,096,409 B2* | 1/2012 | Wipf | B65G 19/02 198/728 |
| 8,430,233 B2* | 4/2013 | Fischer | H02K 41/033 198/343.1 |
| 8,720,673 B2* | 5/2014 | Loecht | B65G 19/02 198/619 |
| 8,827,071 B2* | 9/2014 | van de Loecht | B65G 54/02 198/619 |
| 9,045,291 B2* | 6/2015 | Konrad | B65G 47/71 |
| 9,061,838 B2* | 6/2015 | van de Loecht | B65G 47/31 |
| 9,079,724 B2* | 7/2015 | van de Loecht | B65G 47/841 |
| 9,446,902 B2* | 9/2016 | Aumann | B65G 17/32 |
| 2004/0256918 A1* | 12/2004 | Beakley | |
| 2008/0193270 A1* | 8/2008 | Yoshida et al. | |
| 2008/0219825 A1* | 9/2008 | Yoshida et al. | |
| 2015/0027338 A1* | 1/2015 | Aumann et al. | |
| 2015/0041288 A1* | 2/2015 | Van De Loecht et al. | |
| 2015/0136564 A1 | 5/2015 | Hurni et al. | |
| 2015/0274433 A1* | 10/2015 | Hanisch et al. | |

FOREIGN PATENT DOCUMENTS

| | | |
|---|---|---|
| EP | 2088644 A1 | 8/2009 |
| JP | 2001 057712 A | 2/2001 |
| WO | WO 2013/156177 A1 | 10/2013 |

\* cited by examiner

TRANSPORT DEVICE FOR CONVEYING PRODUCTS

RELATED APPLICATIONS

The present patent document claims the benefit of and priority to European Patent Application No. EP 14198627.3 filed Dec. 17, 2014, the entire contents of which are incorporated herein by reference.

FIELD AND BACKGROUND

The present disclosure relates to a transport device for conveying products.

In one example of a known transport device for conveying products, several slides are moved along a guide rail independently of each other. The guide rail comprises a linear motor drive device for driving the slides, wherein each slide comprises at least one permanent magnet, which interacts with the linear motor drive device. A transport device of this type with a linear motor drive is known from WO 2013/156177 A1.

A transport device which uses a guide rail and several slides individually movable along the guide rail is also known from DE 10 2012 210 329 A1. The slides comprise retaining elements projecting from them perpendicularly to the conveying direction. For the transport of a single product, a pair of slides is provided, wherein the slide in the rear acts as the pusher slide, and the slide in the front acts as the retaining slide. The movement of the slides is controlled in such a way that the product is held between the retaining elements of the two slides. As long as the product is being transported along a straight rail, no problems occur. But if the products are moved along a path which changes direction at certain points, the retaining elements shift their positions relative to each other. As a result, the product is no longer retained reliably

SUMMARY

It is an object of the present disclosure to provide a transport device for conveying products by means of which the products can be reliably transported independently of each other along paths of varying conveying directions.

According to an aspect of the present disclosure, the device for conveying products comprises at least one pair of movable first and second slides for conveying at least one product, and also an endless guide rail for guiding the at least one pair of slides, one behind the other, in a variable conveying direction. A linear motor drive device is provided to drive the at least one pair of slides, wherein at least the first slide comprises at least one permanent magnet, which interacts with the linear motor drive device. A retaining element is provided on each of the two slides, and the retaining elements on the first and second slides form a product receiving space between them. The first retaining element is supported rotatably around a first rotational axis which extends in a direction substantially perpendicular to the variable conveying direction. The second retaining element is supported rotatably around a second rotational axis which extends in a direction substantially perpendicular to the variable conveying direction. At least one connecting element for connecting the retaining elements of the first and second slides is provided in such a way as to determine or maintain a relative orientation of the first and second retaining elements to each other.

Because the retaining elements are able to rotate relative to the slides without the orientation of the retaining elements to each other being lost, the slides can assume different orientations with respect to each other. Thus the product is held reliably in place even in the curved parts of the guide rail.

If the retaining elements, furthermore, are arranged to be perpendicular to the at least one connecting element, corresponding parallel retaining surfaces, between which a product is reliably held, are advantageously formed on the retaining elements.

As the pair of slides is guided along a section of the guide rail with a varying conveying direction, the retaining elements rotate relative to the first and second slides.

The at least one connecting element is preferably configured as a connecting rod. The connecting rod represents a realization which can be manufactured easily and inexpensively.

It may be advantageous for at least one of the retaining elements to comprise a through-opening, through which the connecting rod passes. As a result, a linear guide is realized between the at least one retaining element and the connecting rod, this linear guide facilitating the positioning of the retaining element relative to the other retaining element along the connecting rod.

According to one embodiment, the at least one connecting rod accommodated in the through-opening fits positively in the opening and thus prevents the retaining element from tilting relative to the at least one connecting element. Thus, although this arrangement prevents the retaining element from tilting, it allows the retaining element to shift along the connecting rod in a linear manner.

It may be advantageous for the retaining elements to be arranged on the sides of the first and second slides which face each other. This makes it possible for the retaining elements arranged on the slides to be brought up as closely as possible to each other to hold narrow products. This may be especially advantageous when the slides pass around curved sections of the guide rail.

In another embodiment, the retaining element of the first slide can be rigidly fastened to the first slide, and the connecting element functions as a guide device, on which the retaining element of the second slide is slidably supported. The distance between the retaining elements can thus be varied continuously. Thus, in an advantageous manner, products with different dimensions or widths can be conveyed by the same pair of slides. Parts of predefined format or manual adjustments to the transport device are therefore no longer necessary to transport different products.

In cases where the retaining elements of the first and second slides are rigidly, but possibly detachably, fastened to the connecting element, an arrangement of retaining elements is obtained with a fixed, unchangeable gap. In addition, the retaining elements are also connected rigidly to each other by means of the connecting element. This therefore offers the advantage that it is sufficient for only one of the two slides to be actively driven. The permanent magnets of the second slide are in this case usually used only to pretension its rollers against the guide rail. Under certain circumstances, it may be possible to omit the permanent magnets on the second slide completely.

It may be preferable, furthermore, for both the first and second slides to be actively driven, wherein the movements of first and second slides are controlled in such a way that the gap between the retaining elements remains constant.

In one possible embodiment, the endless guide rail defines a guide rail plane, and the retaining elements are arranged so that they are perpendicular to the guide rail plane.

In an alternative embodiment, the endless guide rail defines a guide rail plane, and the retaining elements are arranged so that they are parallel to the guide rail plane.

DETAILED DESCRIPTION OF SPECIFIC EMBODIMENTS

Figure 1:
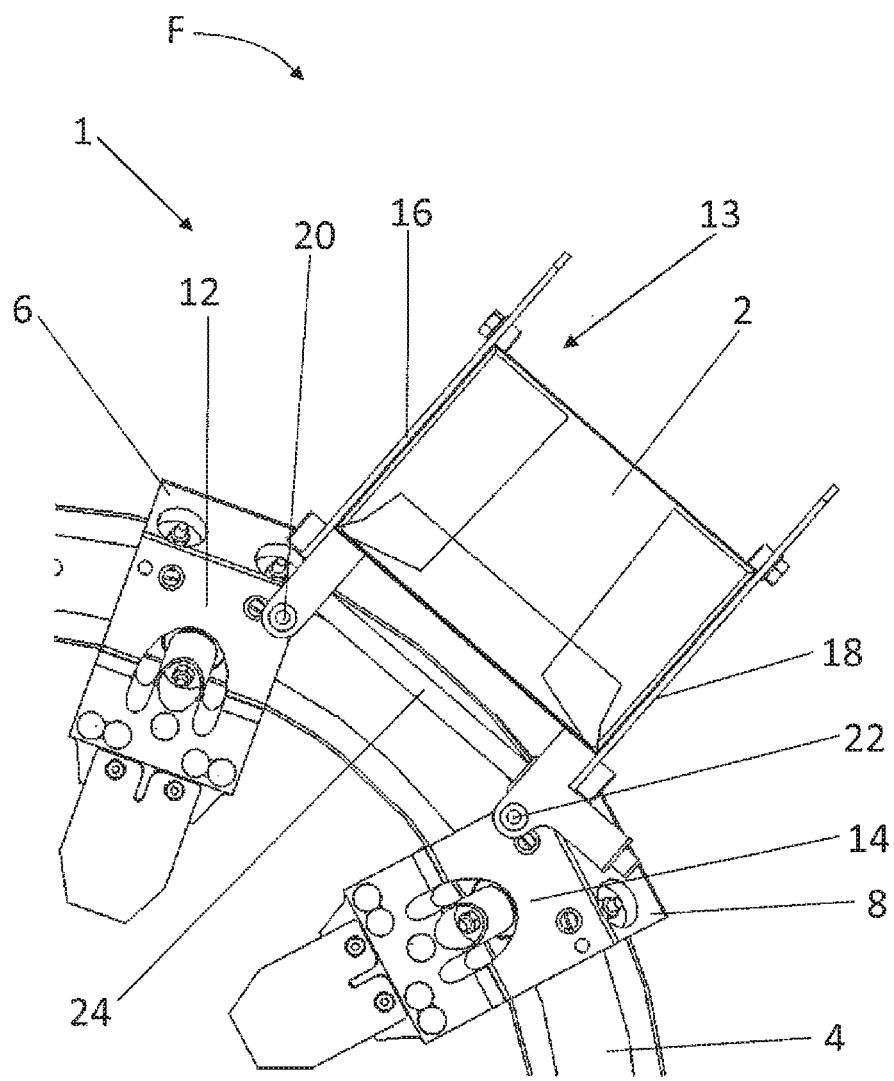
FIG. 1 shows a side view of a section of a first embodiment of a transport device according to the present disclosure, which is transporting a wide product.

FIG. 1 shows a side view of the structure of a first embodiment of a transport device 1 according to the present disclosure for conveying products 2, especially folding boxes. The transport device 1 comprises a stationary, endless guide rail 4 for guiding at least one pair of movable slides, i.e., a first slide 6 and a second slide 8, in a variable conveying direction F. The conveying direction F can also be opposite to the one shown. The slides serve to convey the products 2 and are moved along the guide rail 4. Even though only one pair of slides 6, 8 is shown in FIG. 1, usually several pairs of slides 6, 8 will be moving simultaneously along the same guide rail 4. Within the pair, either the first slide 6 or the second slide 8 can be in the leading position with respect to the conveying direction F.

FIG. 1 shows only a part, namely, a curved section, of the endless guide rail 4. The first and second slides 6, 8 move along the outer side of the guide rail 4 in the clockwise or counterclockwise direction, passing once around the entire guide rail 4 before arriving in their starting position again. The slides 6, 8 can be filled at a suitable point with products 2, and the products 2 can be removed again from the slides 6, 8 at another suitable point.

Figure 3:
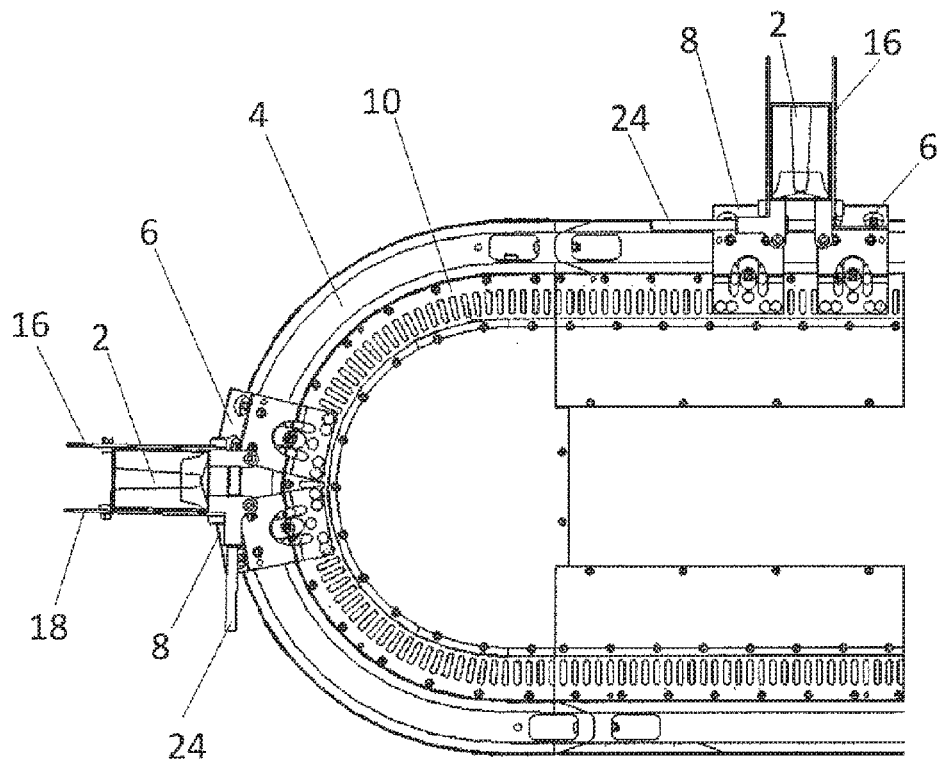
FIG. 3 shows another side view of a section of the first embodiment of the transport device according to the present disclosure, in which a pair of slides is shown on a straight section of the guide rail, and a another pair of slides is shown on a curved section of the guide rail.
Figure 4:
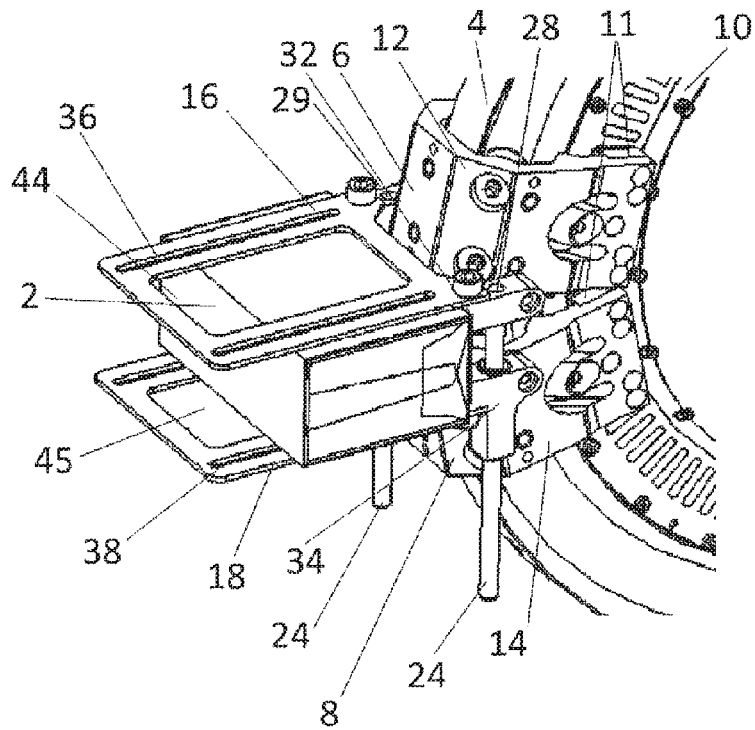
FIG. 4 shows an enlarged perspective view of the pair of slides in the curved section of the guide rail of FIG. 3.

To drive the slides 6, 8, a linear motor drive device 10 is used, which is shown in FIGS. 3 and 4. The linear motor drive device 10 is arranged inside the oval shape defined by the guide rail 4 and is itself also oval in shape. The linear motor drive device 10 comprises a plurality of coils, arranged in a row (not shown), which can be supplied individually with current. At least one of the slides 6, 8 comprises at least one, preferably two, permanent magnets 11 (see FIG. 4), which interact with the linear motor drive device 10.

As FIG. 4 indicates, each slide 6, 8 comprises a substantially horseshoe-shaped or inverted U-shaped base body 12, 14. The base bodies 12, 14 are supported on, and guided along, the guide rail 4 by a plurality of rollers (not shown).

The slides 6, 8 and the mechanism by which they are supported on the guide rail 4 can be configured in many different ways.

Looking again at FIG. 1, at least one retaining element 16, 18 is arranged on each of two slides 6, 8, specifically on the base bodies 12, 14. The first and second retaining elements 16, 18 thus form a product receiving space 13 between them and firmly hold the at least one product 2 in this intermediate space. The first and second retaining elements 16, 18 are preferably symmetric, especially parallel, to each other and project from the slides, 6, 8 on the side facing away from the guide rail 4, i.e., toward the outside.

Each of the retaining elements 16, 18 is supported rotatably around its own rotational axis 20, 22 on the associated slide 6, 8 The rotational axes are perpendicular to the conveying direction F, i.e., perpendicular to the plane E, which is defined by the guide rail 4. Between the two retaining elements 16, 18, there extends at least one connecting element 24, which, in the example shown, is configured as a connecting rod. By means of the at least one connecting element 24, the orientation of the retaining elements 16, 18 to each other is determined and maintained, independently of the course of the guide rail 4. Usually, two connecting elements 24 will be provided and arranged symmetrically with respect to the slides 6, 8.

To determine the orientation of the retaining elements 16, 18 to each other, each of the retaining elements 16, 18 has at least one through-opening 28, 30 formed in it, in which the at least one connecting element 24 is held in a positively-fitting manner. In the present case, each connecting element 24 and also each of the through-openings 28, 30 have a circular cross section. Many other cross-sectional shapes are also possible, however.

Each of the through-openings 28, 30 is perpendicular to the plane in which the retaining elements 16, 18 are arranged and thus also parallel to the plane defined by the endless guide rail 4. The positive fit between the connecting elements 24 and the associated through-openings 28, 30 in the retaining elements 16, 18 results from the fact that sections of the external circumference of the connecting elements 24 rest against the internal circumferential sections of the through-openings 28, 30 in such a way that the retaining elements 16, 18 are prevented from tipping relative to the connecting element 24.

In addition, at least one of the retaining elements 16, 18 can be slidingly supported in the longitudinal direction of the connecting element 24. In this case, the connecting element 24 functions as a longitudinal guide device for the sliding movement of the at least one retaining element 16, 18 in the longitudinal direction, so that the gap between the retaining elements 16, 18 can be adjusted. To set a certain gap, a locking device such as a locking screw can be provided in one of the retaining elements 16, 18.

Figure 2:
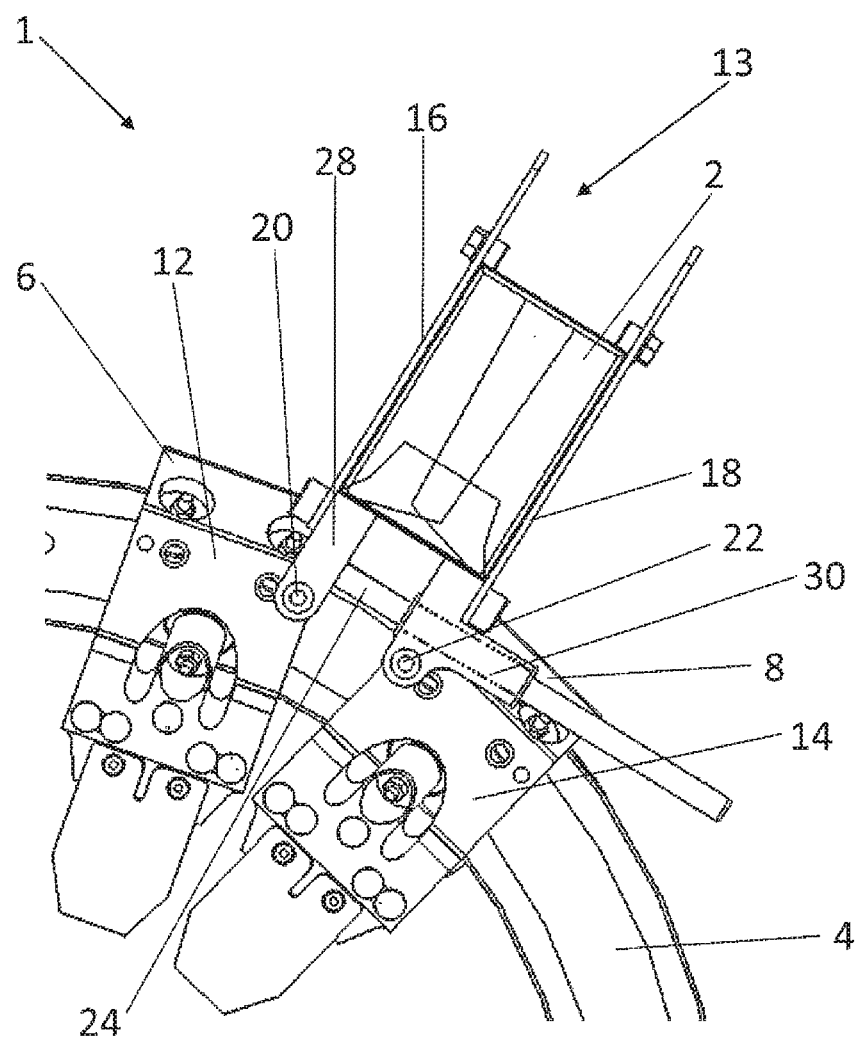
FIG. 2 shows a side view of a section of the first embodiment of the transport device according to the present disclosure, which is transporting a narrow product.

Whereas a wide product 2 is being transported by the transport device 1 in FIG. 1, FIG. 2 shows the same arrangement with the single difference that the retaining elements 16, 18 are arranged only a short distance apart so that a narrow product 2 can be transported. Otherwise, FIGS. 1 and 2 are identical, wherein the same reference numbers designate the same parts, so that there is no need for these identical parts to be described again.

In contrast to the arrangement in FIG. 1, the gap between the two slides 6, 8 has been reduced by moving the slides 6, 8 toward each other. The first retaining element 16 of the first slide 6 is rigidly connected to the connecting element 24, as also in FIG. 1, and the second slide 8 with the second retaining element 18 has been pushed along the connecting element 24 in the direction toward the first slide 6, so that a smaller gap is formed between the retaining elements 16, 18 to accommodate a narrow product 2.

In FIG. 2, furthermore, the two slides 6, 8 are arranged at the minimum distance from each other, i.e., the distance at which the slides 6, 8 almost but not quite touch each other as they travel around the curved section of the guide rail. To achieve the minimum gap between the retaining elements 16, 18 needed to accommodate narrow products 2, the retaining elements 16, 18 are arranged on the facing sides of the first and second slides 6, 8.

In FIG. 3, two pairs of slides, each with a first and a second slide 6, 8, are arranged on the guide rail 4. The section of the guide rail 4 shown belongs to the left half of a guide rail arrangement with an overall oval shape. One of the two pairs of slides 6, 8 is shown in the upper, straight section of the oval guide rail 4, the other pair in the curved section. Each pair of slides 6, 8 will thus execute movement both along straight sections and along curved sections of the rail.

In a comparison of the two pairs of slides in FIG. 3, the slides 6, 8 of the pair located in the straight section of the guide rail 4 are parallel to each other. In contrast, the slides 6, 8 of the pair located in the curved section of the guide rail 4 are at an angle to each other. In both cases, the retaining elements 16, 18 are parallel to each other and perpendicular to the connecting element 24, and the product 2 is held between the retaining elements 16, 18.

FIG. 4 shows a perspective magnified view of one of the pairs of slides 6, 8 shown in FIG. 3. Each of the retaining elements 16, 18 consists of a base part 32, 34 and a retaining part 36, 38. As illustrated, the retaining parts 36, 38 are formed as retainer brackets, are preferably in the form of plates, and are provided with openings 44, 45. The retaining elements 16, 18 are also provided with a U-shaped recess on the sides facing the slides 6, 8. A connecting section, which joins the two legs of the U-shaped base body 12, 14 of the slides 6, 8 fits into these U-shaped recesses. The retaining elements 16, 18 are preferably rotatably supported on two opposite sides of the base bodies 12, 14.

The base parts 32, 34 are arranged on facing sides of the retaining parts 36, 38 and are shorter than the retaining parts 36, 38. Thus each of the base parts 32, 34 forms a partial support surface for the products 2 being held between the retaining parts 36, 38. The size and shape of the retaining parts 36, 38 and of the base parts 32, 34 can, of course, vary.

Figure 5:
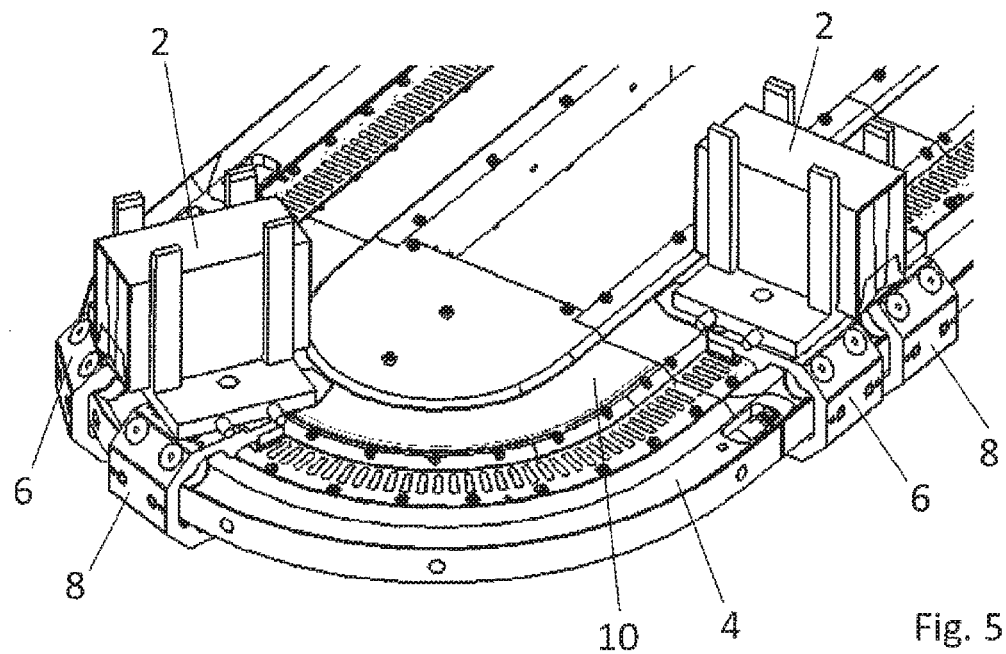
FIG. 5 shows a perspective view of a section of a second embodiment of a transport device according to the present disclosure.
Figure 6:
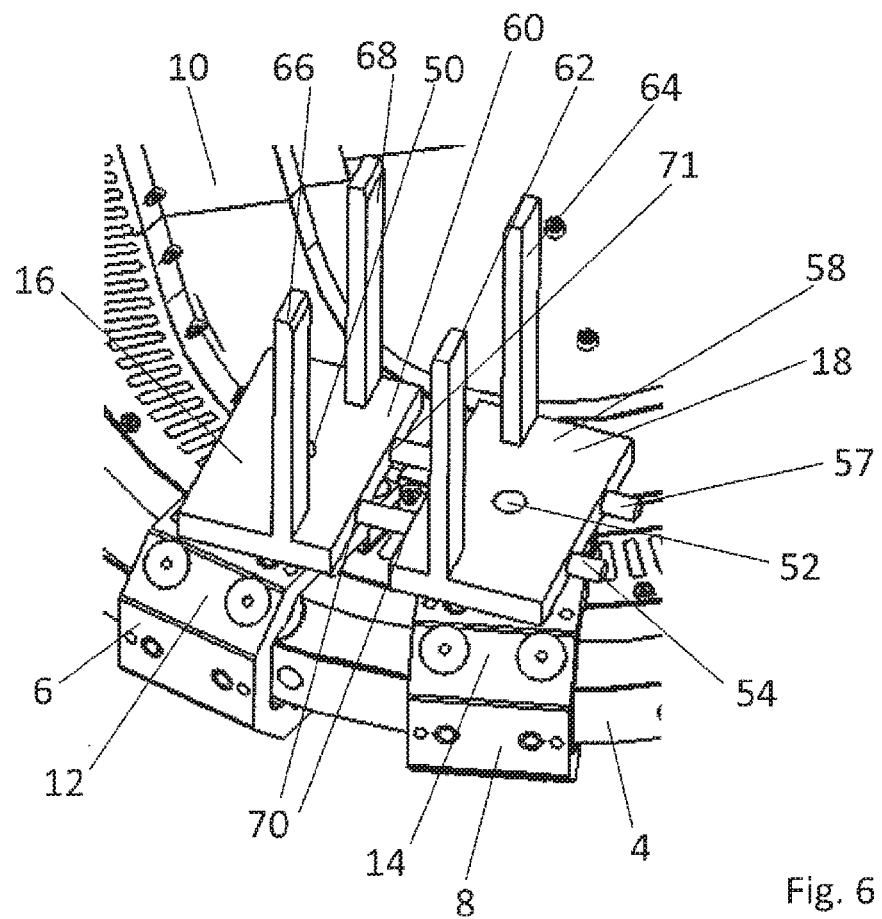
FIG. 6 shows an enlarged perspective view of the pair of slides in the curved section of the guide rail of FIG. 5.

FIGS. 5 and 6 show perspective views of the structure of a second embodiment of the transport device 1 according to the present disclosure for conveying products 2, especially folding boxes. Essential parts of the embodiment of FIGS. 5 and 6 are identical to the embodiment of FIGS. 1-4, wherein the same reference numbers designate the same parts, so that there is no need to repeat the description of the identical parts.

In contrast to FIGS. 1-4, in which the guide rail 4 was arranged in a vertical plane, FIGS. 5 and 6 show a transport device 1 in which the guide rail 4 is arranged in a horizontal plane. The section of the guide rail 4 shown in FIG. 5 is part of a guide rail arrangement with an overall oval shape with two straight rail sections and two curved rail sections.

A retaining element 16, 18 is provided on each of the two slides 6, 8, in particular on the base bodies 12, 14 of the slides 6, 8. The first and second retaining elements 16, 18 are substantially parallel to each other, perpendicular to the conveying direction F of the slides 6, 8, and perpendicular to a horizontal plane, which is defined by the endless guide rail 4. Each of the two the retaining elements 16, 18 is supported rotatably around its own rotational axis 50, 52 on its assigned slide 6, 8. The first and second rotational axes 50, 52 are perpendicular to the conveying direction F, i.e., perpendicular to the plane defined by the guide rail 4. In addition, at least one connecting element 54, preferably in the form of a connecting rod, is arranged between the two retaining elements 16, 18. The at least one connecting element 54 determines the orientation of the retaining elements 16, 18 to each other.

Each retaining element 16, 18 consists here of a base plate 58, 60 and two retainer plates 62, 64, 66, 68, which project perpendicularly from the base plate 58, 60. Each of the retainer plates 62, 64, 66, 68 is rotatably supported by the base plate 58, 60 on the first and second slides 6, 8.

So that a product 2 can be held reliably, it is essential for the retaining surfaces of the retaining elements 16, 18 to have a fixed orientation to each other. To establish the parallel alignment of the retaining surfaces of the retaining elements 16, 18, two through-openings 70, 71 are formed in the retaining elements, specifically in the base plates 58, 60. The connecting elements 54 fit positively in these through-openings.

The through-openings 70, 71 pass through the base plates 58, 60 perpendicularly to the retainer plates 62, 64, 66, 68 and parallel to the plane defined by the endless guide rail 4. The positive connection between the connecting elements 54 and the through-openings 70, 71 prevents the retaining elements 16, 18 from twisting relative to each other and thus prevents the retaining surfaces of the retainer plates 62, 64, 66, 68 from moving out of their parallel orientation to each other. As in the first embodiment, at least one of the retaining elements 16, 18 is slidingly supported in the longitudinal direction of the connecting elements 54. In this case, the connecting elements 54 serve as a longitudinal guide device for the sliding movement of the at least one retaining element 16, 18 in the longitudinal direction. As a result, the distance between the retaining elements 16, 18, specifically between the retainer plates 62, 64, 66, 68, can be adjusted.

The transport device 1 can operate in various modes. In a first operating mode, both the first and second slides 6, 8 are actively driven. In this case, both retaining elements 16, 18 can be rigidly (preferably detachably) fastened to the at least one connecting element 24, 54. It is also conceivable that one of the retaining elements 16, 18 could be rigidly (preferably detachably) fastened to the connecting element 24, 54, whereas the other retaining element 16, 18 is slidingly connected to the connecting element 24, 54. Finally, it is also conceivable that both retaining elements 16, 18 could be connected slidingly to the connecting element 24, 54. The setting of the distance between the retaining elements 16, 18 in the two latter cases is accomplished solely by the way in which the drive of the first and second slides 6, 8 is controlled.

In another operating mode, both of the retaining elements 16, 18 can be rigidly (preferably detachably) fastened to the at least one connecting element 24, 54, and only one of the slides 6, 8 is actively driven, whereas the other slide 6, 8, i.e., the slide not being actively driven, is moved concomitantly with the actively driven slide 6, 8 by virtue of the at least one connecting element 24, 54. In this case, it is advantageous for the at least one permanent magnet 11 of the non-actively driven slide 6, 8 to be at least able to pretension the rollers of the slide 6, 8 against the guide rail 4.

The arrangement and geometry of the retaining elements 16, 18 can vary, depending on the concrete application and on the type and size of the products 2 to be transported. For example, the retaining elements 16, 18 do not have to be parallel to each other. They could instead be held at a predetermined angle to each other. The retaining surfaces could also comprise not only straight but also rounded sections.

The invention claimed is:

1. A transport device for conveying products comprising:
   at least one pair of first and second movable slides for conveying at least one product;
   an endless guide rail for guiding the at least one pair of first and second slides, one of the first and second slides behind the other, in a variable conveying direction;
   a linear motor drive device for driving the at least one pair of first and second slides, wherein at least the first slide comprises at least one permanent magnet, which interacts with the linear motor drive device;
   a first retaining element arranged on the first slide, and a second retaining element arranged on the second slide, the first and second retaining elements forming a product receiving space between them,
   wherein the first retaining element is rotatably supported on the first slide around a first rotational axis, and the second retaining element is rotatably supported on the second slide around a second rotational axis, the first and second rotational axes being substantially perpendicular to the variable conveying direction; and
   at least one connecting element for connecting the first and second retaining elements and configured to maintain a relative orientation of the first and second retaining elements to each other.

2. The transport device according to claim 1, wherein the first and second retaining elements are positioned symmetrically to each other by the at least one connecting element.

3. The transport device according to claim 2, wherein the first and second retaining elements are held parallel to each other by the at least one connecting element.

4. The transport device according to claim 3, wherein the first and second retaining elements are arranged perpendicularly to the at least one connecting element.

5. The transport device according to claim 1, wherein the guide rail comprises at least one section of variable conveying direction, and the conveying of the at least one pair of first and second slides along the at least one section of variable conveying direction effects rotation of the first and second retaining elements relative to the first and second slides.

6. The transport device according to claim 1, wherein the at least one connecting element is a connecting rod.

7. The transport device according to claim 6, wherein at least one of the first and second retaining elements comprises a through-opening, through which the at least one connecting element passes.

8. The transport device according to claim 7, wherein the at least one connecting element, accommodated in the through-opening, prevents the first or second retaining element from tilting relative to the at least one connecting element by means of a positive-fit connection.

9. The transport device according to claim 1, wherein the first and second retaining elements are arranged on facing sides of the first and second slides.

10. The transport device according to claim 1, wherein the first retaining element is rigidly fastened to the at least one connecting element, and the at least one connecting element also functions as a guide device, on which the second retaining element is slidingly supported.

11. The transport device according to claim 1, wherein the first and second retaining elements are rigidly fastened to the at least one connecting element.

12. The transport device according to claim 1, wherein the first and second retaining elements are detachably fastened to the at least one connecting element.

13. The transport device according to claim 1, wherein the first and second slides are actively driven, wherein a drive of the first and second slides is controlled in such a way that a gap between the first and second retaining elements remains constant.

14. The transport device according to claim 1, wherein the guide rail defines a guide rail plane, and the first and second retaining elements are arranged vertical to the guide rail plane.

15. The transport device according to claim 1, wherein the guide rail defines a guide rail plane, and the first and second retaining elements are arranged parallel to the guide rail plane.

* * * * *